United States Patent [19]

Fierz et al.

[11] Patent Number: 5,478,535
[45] Date of Patent: Dec. 26, 1995

[54] APPARATUS FOR GAS - LIQUID REACTIONS

[75] Inventors: Gérard Fierz, Lutry, Switzerland; Peter Forschner, Hasel, Germany; Jean-Pierre Landert, Montreux; Pierre Marmillod, La Tour-De-Peilz, both of Switzerland

[73] Assignees: Biazzi SA, Chantilly s/Montreux, Switzerland; Exato GmbH, Schopfheim, Germany

[21] Appl. No.: 253,863

[22] Filed: Jun. 3, 1994

[30] Foreign Application Priority Data

Jul. 8, 1993 [CH] Switzerland ............ 02 054/93

[51] Int. Cl.⁶ ............................................. F28D 11/02
[52] U.S. Cl. .................... 422/205; 422/198; 422/224; 165/109.1; 165/120
[58] Field of Search .................. 422/198, 200, 422/201, 205, 224, 225, 228, 231; 165/109.1, 120; 366/156, 169, 170, 171, 144, 302

[56] References Cited

U.S. PATENT DOCUMENTS

| | | | |
|---|---|---|---|
| 2,273,835 | 2/1942 | Cornell | 366/169 |
| 2,460,987 | 2/1949 | Kanhofer | 422/227 X |
| 2,875,027 | 2/1959 | Dye | 165/109.1 |
| 2,973,944 | 3/1961 | Etter | 165/109.1 X |
| 3,400,051 | 9/1968 | Hefschneider | 165/120 |
| 4,670,397 | 6/1987 | Wegner et al. | 165/109.1 X |

FOREIGN PATENT DOCUMENTS

| | | |
|---|---|---|
| 213247 | 2/1984 | Czechoslovakia . |
| 0347653 | 12/1989 | European Pat. Off. . |
| 1176160 | 4/1959 | France . |
| 3429355 | 2/1986 | Germany . |
| 2-115295 | 4/1990 | Japan . |
| 1112582 | 5/1968 | United Kingdom . |
| 1238532 | 7/1971 | United Kingdom ............ 366/169 |
| 1358157 | 6/1974 | United Kingdom ............ 366/169 |

OTHER PUBLICATIONS

By P. Seichter et al., "Reactor for Catalytic Hydrogenation in the Liquid Phase", Chemical Abstracts, vol. 100, No. 26, Jun. 1984, 212187z, p. 123.

*Primary Examiner*—Timothy M. McMahon
*Attorney, Agent, or Firm*—Young & Thompson

[57] ABSTRACT

This apparatus for gas-liquid reactions includes a vessel (1) which is gas-tight and capable of withstanding pressure, a rotatory agitator device (3) to provide for the gas-liquid contact and a heat exchanger device. This heat exchanger device is provided as an assembly of plates (4) positioned approximately vertically around the agitator device, in such a manner as to form an angle of 0 to 70° with respect to the radius, in the direction of rotation of the agitator device, and a heat exchanger fluid circulates inside these plates.

7 Claims, 3 Drawing Sheets

APPARATUS FOR GAS - LIQUID REACTIONS

FIELD OF THE INVENTION

The present invention is concerned with an apparatus for gas-liquid reactions, for example for carrying out chemical gas-liquid reactions such as oxygenation, ozonization, amination, ethoxylation, catalysed hydrogenation, etc.

BACKGROUND OF THE INVENTION

In chemistry, processes in which gas-liquid reactions are involved are extremely numerous. To ensure the contact between a liquid often containing a solid suspended catalyst and the reacting gas, quite a number of different techniques can be used. The usual solutions resort either to the agitation of the liquid by the gas itself, or to the introduction of the gas into a reactor equipped with a mechanical stirrer, or further to a gas-liquid contactor of the ejector type. However, owing to the complexity of the parameters influencing reactions in a heterogeneous medium, such as the rate of transfer of the products involved in the desired reaction at the interface (mass transfer), the hydrodynamic behaviour of the medium and its capacity to maintain suspended a heterogeneous catalyst, the deactivation of the latter in the absence of a saturation by the reacting gas and the important thermal phenomena (heat transfer) taking place, the construction of a high performance reador is always difficult, most of all when secondary or parallel reactions occur which affect the selectivity of the overall process. These synthesis reactions, in particular catalysed hydrogenation, are very often carried out under pressures which can reach 100 bar and temperatures varying between 30° and 300° C., and this places constraints on the equipment to be used and poses considerable problems, in particular in industrial plants, where one must ensure high standards of safety and reliability, and low maintenance costs.

SUMMARY OF THE INVENTION

The present invention is aimed at providing a new reactor suitable for carrying out gas-liquid reactions under conditions which are safe and advantageous, in that it allows a control of the operating conditions which is both effective and easy, provides a high level of productivity, yields reaction products of improved quality, lowers the catalyst consumption, and ensures simplicity of operation and ease of maintenance.

The above-mentioned objective is attained by the apparatus for gas-liquid reactions according to the invention, which includes a gas-tight vessel which can withstand pressure, a rotatory agitator device providing for the contact between the gas and the liquid and also for the circulation of the contents of the vessel, and a heat exchanger device, and which is characterized in that the heat exchanger device is provided as an assembly of plates positioned approximately vertically around the agitator device, in such a manner as to form an angle of 0° to 70° with respect to the radius, in the direction of rotation of the agitator device, and in that a heat exchanger fluid circulates inside these plates.

The plates of the heat exchanger, which also act as turbulence enhancers, can be flat, bent (to form an obtuse angle), or curved in the direction of rotation of the agitator and their surface is preferably not smooth (for example, it is made slightly uneven).

According to one version of the invention, the device used for stirring and promoting the internal circulation is of the self-aspirator type; it can include a central rotatory hollow shaft with suction openings for the gas in its upper part and a gassing turbine in its lower part, the inlet for the liquid of this turbine being located in the lower part thereof. This agitator device can further be provided with additional circulators.

Finally, the vessel of the apparatus of the invention can include in its upper part, at the same level as the suction openings for the gas of the agitator device, a gas-tight chamber.

DETAILED DESCRIPTION OF THE INVENTION

The invention will now be described more in detail with reference to the annexed drawings illustrating schematically and by way of example one embodiment only of the apparatus for gas-liquid reactions.

Figure 1:
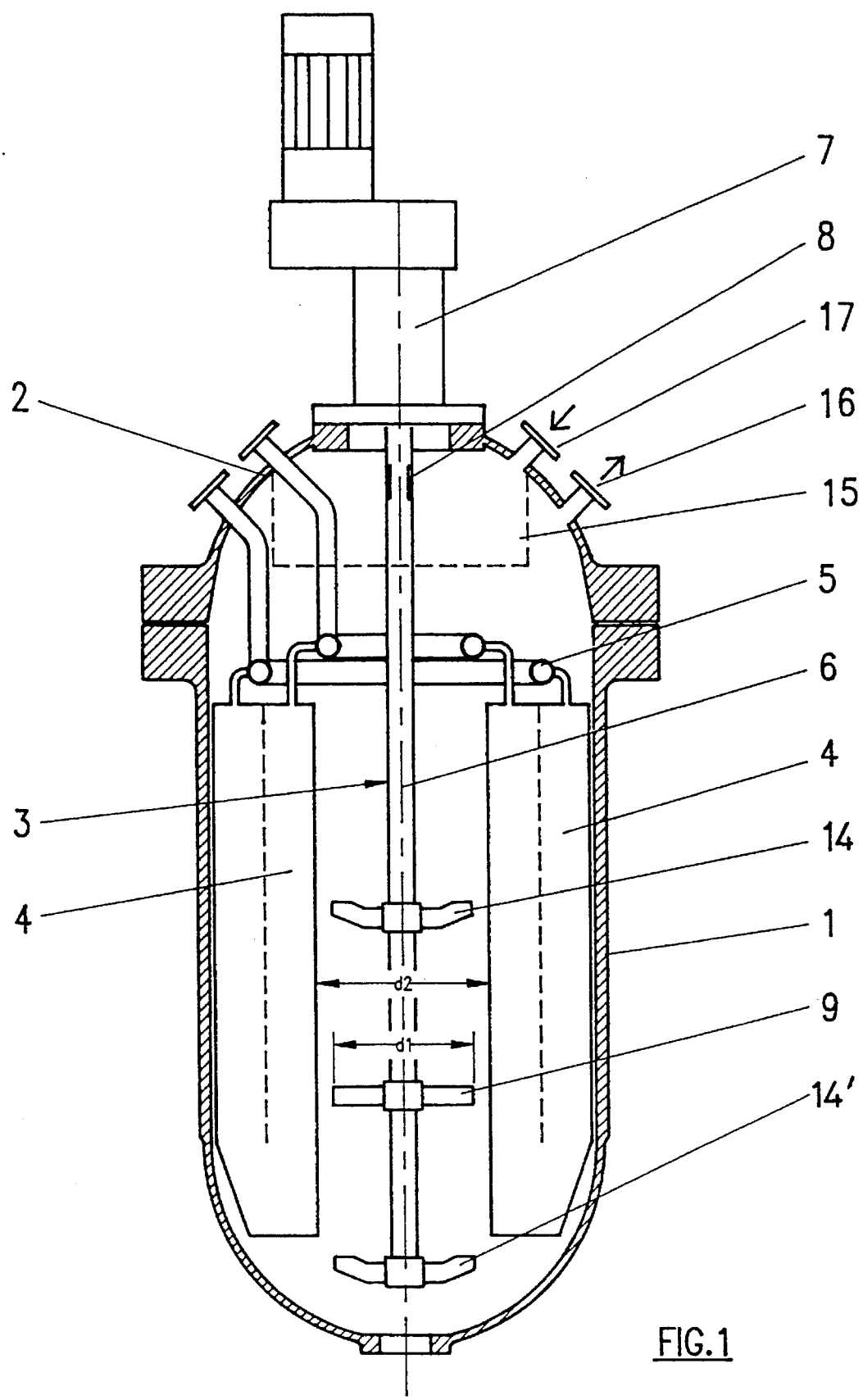
Figure 2:
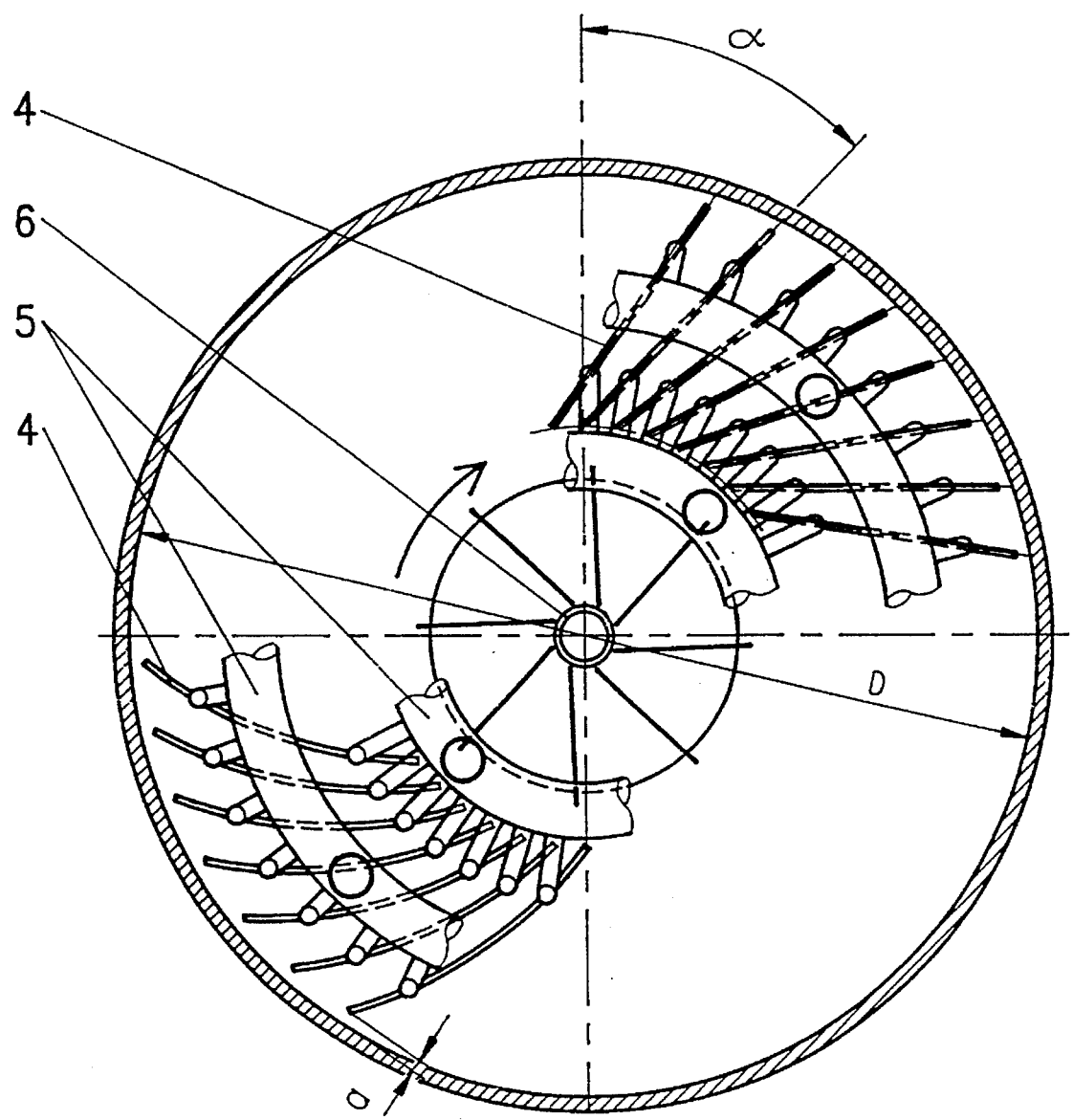
Figure 3:
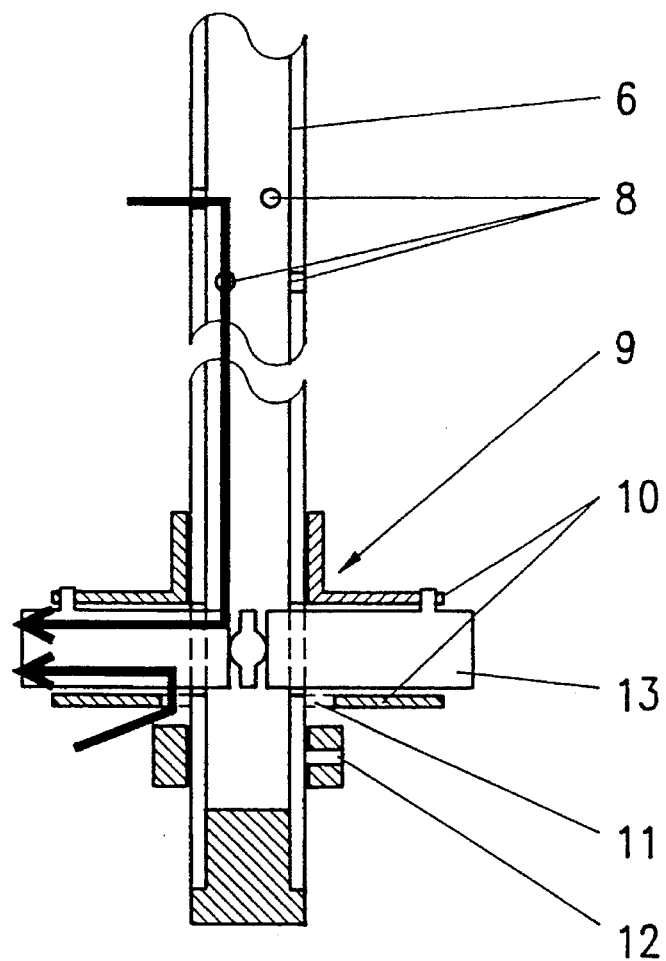
Figure 4:
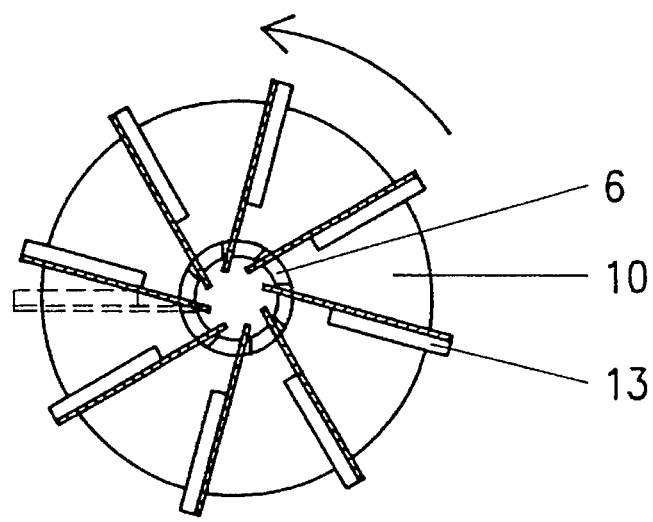

FIGS. 1 and 2 are cross-sectional views, taken respectively horizontially and vertically, FIGS. 3 and 4 are partial views illustrating a self-aspirator agitator device which can be used in the apparatus according to the invention.

With reference to FIGS. 1 and 2, the apparatus for gas-liquid reactions includes a vessel 1 capable of withstanding pressures up to 100 bar, depending on its thickness. Its shape is, for example, cylindrical, with the concave bottom being hemispherical, elliptical, or similar. A conical bottom can also be used. The upper part can be formed with a cover 2 which is either fastened with a flange or welded, and of which the shape is not essential for the present invention. To achieve an adequate circulation of the liquid and an effective suction of the gas, it is advantageous to maintain a ratio of length of the cylinder to its diameter comprised between 0.3 and 3. Here, this ratio is close to 1. To enable the introduction of the gas into the reactor and to ensure the stirring and the circulation of the liquid, the apparatus includes an agitator device 3 of the self-aspirator type, which will be described in detail further.

To accommodate heat exchanges which are often high, the reactor further includes an internal heat exchanger, formed as an assembly of plates 4 arranged regularly within the reactor and fastened by their upper ends for example to one or several manifolds 5 in which circulates — as well as in the plates themselves — an appropriate heat exchanger fluid. The number of plates 4 is variable and is selected according to the overall heat exchange surface required. Best results are achieved by circulating water under pressure, because of its favourable thermal characteristics. For high temperature applications, other heat exchanger fluids (DOWTHERM® for example) can be used. It is preferable that the heat exchange plates be arranged vertically, to prevent the deposition of solid material or of catalyst when used from the reaction mixture during the operations of emptying of the apparatus of the present invention. Thus, the washing operations of the reactor are made simpler and easier, which is an advantage by comparison with the conventional systems including heating/cooling coils or other tubular members.

The plates 4 of the heat exchanger do not have for sole function to ensure the necessary heat transfer, but they also function to ensure the appropriate circulation of the liquid in the reactor, by acting as turbulence enhancers. To this end, the plates should be fastened at an angle α in the direction of rotation of the agitator, of 0° to 70° with respect to the radius, and preferably of 30° to 55°. In other words, each plate forms an angle α of from 0° to 70° relative to an axial plane bisecting the agitator device, and containing that plate's inner edge (see FIG. 2). The plates can be flat, bent (to form an obtuse angle) or curved, to improve their mechanical resistance. Surprisingly, in the last case, which corresponds to the embodiment illustrated, it has been found that the circulation of the liquid was improved and that the coalescence of the bubbles of the reacting gas was decreased, when the curvature is in the direction of rotation of the liquid and when the radius of curvature is within the range from 0.5 to 2 times the inner diameter of the vessel.

To ensure a good circulation of the liquid and a favourable heat exchange, one should preferably dimension the plates in such a manner that the apparent inner diameter d2 of the plate assembly be in the range from 1.05 to 1.6 times the diameter d1 of the agitator device 3. For the same reason, the gap between the ends of the plates 4 and the reaction vessel 1 should preferably be in the range from 5 to 400 mm, whatever the size of the vessel, and preferably of about 20 mm.

When a high total heat exchange surface is needed, intermediate plates (not illustrated) can be advantageously included into the plate assembly of the heat exchanger. They are placed at equal distances from the main plates 4 and their apparent inner diameter will be at least 0.2 times the diameter of the vessel, and preferably will be equal or close to half the diameter of the vessel. Any type of plate capable of withstanding internal and external pressures can be used. According to a preferred embodiment of the invention, it is advantageous to use plates with an uneven surface to increase the turbulence of the stirred liquid. The cover 2 of the reactor includes a flange to which is fastened the agitator device illustrated in more detail in FIGS. 3 and 4. This device includes a hollow shaft 6 rotatably driven by a motor 7 and exhibiting suction openings 8 for the gas in its upper part and a gassing turbine 9 located in the middle of the assembly of plates 4 of the heat exchanger. This turbine 9 is provided with covering flanges 10 and with an inlet for the liquid 11, situated—contrary to conventional systems—in the lower part. This offers the advantage of sucking the liquid from a zone poor in gas. The efficiency of the conventional self-aspirator agitators is limited by the increased concentration of gas around the turbine, the compressibility of the gas-liquid mixture being the factor limiting the suction which can be achieved by the Venturi effect produced by the agitator. Owing to the configuration selected according to the present invention, a greater operational range is possible. A control device 12 makes it possible to modify advantageously the flow of liquid circulating through the turbine, depending on specific requirements. According to a preferred embodiments, the propeller blades 13 of the turbine 9 are of a concave or of a bent shape, to provide an enhanced centrifugation of the liquid.

To improve the circulation of the liquid in the vessel and to prevent too fast a coalescence of the bubbles of gas in the liquid, the agitator device 3 can further be provided with two additional circulators 14, 14'. The upper circulator 14 directs the liquid downwards, whereas the lower circulator 14' improves the suspensions of solids or of catalysts which may be present in the reaction medium. The driving system 7 of the agitator device 6 is selected in such a manner as to ensure gas-tightness of the apparatus, and eliminate any risks of leakage into the environment, for example it can be a magnetic driving system; other devices using conventional systems including mechanical safety seals can also be used.

When carrying out certain liquid-gas reactions, it may be useful to draw the reaction gas from the vessel to treat it in ancillary apparatuses before recycling into the reaction vessel, which most often necessitates the use of an additional compressor, which is expensive. This can be advantageously avoided with the apparatus according to the present invention by providing in the upper part a gas-tight chamber 15 located at the same level as the suction openings 8 for the gas of the agitator device 3. The reacted gas is drawn out by a conduit 16 and, after passage through an appropriate treatment system, it can be recycled into the reactor via the conduit 17. The capacity of suction of such an agitator device is actually sufficient, not only to achieve a high gas-liquid mass transfer, but also to overcome the pressure drop resulting from the passage of the gas to be treated in the ancillary equipment. Savings both in cost and energy by comparison with the use of an ancillary compressor are thus advantageously achieved.

Apart its high performance, one of the important advantages of the invention lies in the cost savings achieved when constructing and installing such a reactor. By comparison with a loop reactor of a similar performance, the compact structure without external components reduces the cost of its manufacture because less components are needed, and the requirements in terms of floor space and support structures are lesser. The absence of sealing components, which would be in contact with liquids or suspensions and which would be exposed to high stresses resulting from the operating pressures and temperatures, minimizes advantageously the maintenance and the servicing, as usually required in the case of a loop reactor for example.

The apparatus according to the invention is particularly well suited for carrying out catalyzed hydrogenation reactions in liquid phase, owing to its high capacity for transferring hydrogen into the liquid phase (k1a), to the high level of turbulence provided which renews frequently the layers of material coating the catalyst and to its high heat transfer capacity. We were also surprised to find that in a number of cases, the selectivity was particularly high when carrying out reduction reaction which are known to be difficult. It was found that the speed of deactivation of the catalyst used and consequently its consumption were also lower in some eases than those found in conventional industrial reactors. This is ascribed to the precise control over the operating conditions which can be achieved by the judicious combination of heat transfer members and of the agitator device according to the invention, to the absence of hot spots in the reaction medium (a possible source of secondary reactions) and to the advantageous isothermal conditions thus achieved, as well as to the fact that the catalyst at any point of the reactor is exposed to a hydrogen-rich medium, the effect of which is to slow down the poisoning phenomena.

The apparatus accoriling to the invention thus makes it possible to obtain a high speed of mass transfer from gas to liquid, whiles necessitating only a moderate power input into the system. It further provides a high heating and cooling power, while ensuring a strict control of the temperature within the reaction medium and enables to operate at pressures of up to 100 bar and temperatures of up to 300° C., under conditions as perfect as practically possible of tightness, thus excluding any risk of leakage which could affect the environment.

Finally, a further advantage of the apparatus according to the invention is that it is possible to carry out reliably the upsealing of laboratory apparatuses to industrial installations.

We claim:

1. An apparatus for gas-liquid reactions comprising: a gas-tight vessel capable of withstanding pressure, a rotatory agitator device for contacting gas and liquid, and a heat exchanger device, said rotatory agitator device including a hollow rotatory shaft having suction openings for the gas in its upper part, and a gassing turbine having a liquid inlet in its lower part, said heat exchanger device including an assembly of hollow plates extending radially outwardly from the agitator device for circulating a heat exchange fluid inside said plates, said plates having axially extending inner and outer edges, said outer edges being located in the vicinity of the internal wall of the vessel, and each plate forming an angle $\alpha$ of 0° to 70° with respect to an axial plane bisecting the agitator device and containing the inner edge of said each plate.

2. An apparatus according to claim 1, wherein the plates have a surface which is embossed, and said plates are flat, bent or curved in the direction of rotation of the agitator device.

3. An apparatus according to claim 1, wherein said vessel is cylindrical and said plates are fastened by their upper part at least to two manifolds used for the inflow and outflow of the heat exchange fluid.

4. An apparatus according to claim 1, wherein the agitator device further includes one or several circulation impellers fixed on the hollow rotatory shaft.

5. An apparatus according to claim 1, further including a gas-tight chamber in the upper part of the vessel.

6. An apparatus according to claim 5, wherein said gas-tight chamber is situated at the same level as the suction openings for the gas provided in the hollow shaft of the agitator device.

7. An apparatus according to claim 1, wherein the outer edges of the plates form a gap with the inside wall of the vessel, and said gap ranges from 5 to 400 mm.

* * * * *

UNITED STATES PATENT AND TRADEMARK OFFICE
CERTIFICATE OF CORRECTION

PATENT NO. : 5,478,535
DATED : December 26, 1995
INVENTOR(S) : Gerard FIERZ et al.

It is certified that error appears in the above—identified patent and that said Letters Patent is hereby corrected as shown below:

Item [73], change "Chantilly" to --Chailly--;

Item [73], change "Exato" to --Ekato--.

Signed and Sealed this

Twenty-fourth Day of September, 1996

Attest:

BRUCE LEHMAN

Attesting Officer     *Commissioner of Patents and Trademarks*